(12) United States Patent
Chen et al.

(10) Patent No.: US 8,760,823 B1
(45) Date of Patent: Jun. 24, 2014

(54) METHOD AND SYSTEM FOR PROVIDING A READ TRANSDUCER HAVING SOFT AND HARD MAGNETIC BIAS STRUCTURES

(75) Inventors: Laurence L. Chen, Hayward, CA (US); Anup G. Roy, Fremont, CA (US); Yunfei Ding, Fremont, CA (US); Ming Mao, Dublin, CA (US); Amritpal S. Rana, Union City, CA (US); Daniele Mauri, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/332,313

(22) Filed: Dec. 20, 2011

(51) Int. Cl.
 *G11B 5/39* (2006.01)
(52) U.S. Cl.
 USPC ..................... 360/324.12; 360/319
(58) Field of Classification Search
 CPC ............... G11B 5/3932; G11B 5/3903; G11B 2005/3996; G11B 5/3912; G11B 5/3967
 USPC ...................... 360/324–324.2, 319
 See application file for complete search history.

(56) References Cited

U.S. PATENT DOCUMENTS

| | | | |
|---|---|---|---|
| 6,944,939 B2 | 9/2005 | Guo et al. | |
| 7,130,165 B2 | 10/2006 | Macken et al. | |
| 7,229,706 B2 | 6/2007 | Hasegawa et al. | |
| 7,301,734 B2 | 11/2007 | Guo et al. | |
| 7,468,870 B2 | 12/2008 | Arasawa et al. | |
| 7,580,230 B2 | 8/2009 | Freitag et al. | |
| 7,599,158 B2 | 10/2009 | Wang et al. | |
| 7,639,457 B1 | 12/2009 | Chen et al. | |
| 7,675,718 B2 | 3/2010 | Chang et al. | |
| 7,804,668 B2 | 9/2010 | Zhou et al. | |
| 7,848,065 B2 | 12/2010 | Freitag et al. | |
| 7,898,776 B2 | 3/2011 | Nakabayashi et al. | |
| 8,011,084 B2 | 9/2011 | Le et al. | |
| 2009/0180217 A1* | 7/2009 | Chou et al. | 360/324 |
| 2011/0215800 A1* | 9/2011 | Zhou et al. | 324/252 |
| 2011/0273802 A1* | 11/2011 | Zhou et al. | 360/319 |
| 2012/0275062 A1* | 11/2012 | Gao | 360/125.2 |
| 2012/0281320 A1* | 11/2012 | Singleton et al. | 360/319 |

* cited by examiner

*Primary Examiner* — Will J Klimowicz

(57) ABSTRACT

A method and system provide a magnetic transducer having an air-bearing surface (ABS). The magnetic transducer includes a first shield, a read sensor, at least one soft magnetic bias structure and at least one hard bias structure. The read sensor includes a sensor layer that has at least one edge in the track width direction along the ABS. The soft magnetic bias structure(s) are adjacent to the edge(s) of the sensor layer. The soft magnetic bias structure has a first permeability. The soft bias structure(s) are between the read sensor and the hard bias structure(s). The hard bias structure(s) are adjacent to a portion of the soft bias structure(s) and have a second permeability. The first permeability is at least ten multiplied by the second permeability.

9 Claims, 5 Drawing Sheets

US 8,760,823 B1

METHOD AND SYSTEM FOR PROVIDING A READ TRANSDUCER HAVING SOFT AND HARD MAGNETIC BIAS STRUCTURES

BACKGROUND

FIG. 1 depicts an air-bearing surface (ABS) view of a conventional read transducer used in magnetic recording technology applications. The conventional read transducer 10 includes shields 12 and 18, insulator 14, hard bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. Consequently, as used herein a sensor layer 28 is typically a free layer.

If the sensor 20 is to be used in a current perpendicular to plane (CPP) configuration, the insulator 14 is used. Thus, current is driven in a direction substantially perpendicular to the plane of the layers 22, 24, 26, and 28. Conversely, in a current parallel to plane (CIP) configuration, then conductive leads (not shown) would be provided on the hard bias structures 16.

The hard bias structures 16 are used to magnetically bias the sensor layer 28. In an ideal case, the hard bias structures 16 match the thickness, moment, and location of the sensor layer 28. The hard bias structures 16 typically include hard magnetic materials having a low permeability. The hard bias structures generally have a magnetization fixed in the working ranges of the transducer. The hard bias structures 16 typically magnetically bias the magnetization of the sensor layer 28 in the track width direction.

Although the conventional transducer 10 functions, there are drawbacks. The conventional transducer 10 has a shield-to-shield spacing of SS and a physical width of the sensor layer 28 of w. In general, the shield-to-shield spacing is desired to be reduced as higher density memories are to be read. Similarly, the track width is generally decreased as reading of higher density memories and thus higher cross-track resolution are desired. The cross-track resolution of the sensor layer 28 is primarily determined by the physical width, w, of the sensor layer 28. However, magnetic flux entering from the sides of the sensor layer 28 can adversely impact cross-track resolution. Stated differently, magnetic flux entering from the sides of the sensor layer 28 may influence the ability of the sensor layer 28 to accurately read data. The shields 12 and 18 may prevent some flux from reaching the sides of the sensor layer 28. However, as technologies scale to higher recording densities, the shield-to-shield spacing does not decrease sufficiently to address this issue. In addition, other recording mechanisms, such as shingle recording, may require improved cross-track resolution.

A conventional method for improving the cross-track resolution of the conventional transducer 10 is to introduce an in-stack hard bias layer in connection with side shields. An in-stack hard bias layer is one which resides between (on a line parallel to the down track direction) the sensor layer 28 and the shield 12 or directly between the sensor layer 28 and the shield 18. Generally, the in-stack hard bias would reside directly above (in the down track direction/toward shield 18) the sensor layer 28. The in-stack hard bias layer is desired to maintain the magnetic biasing of the sensor layer 28 in the track direction. Thus, the in-stack hard bias layer may replace the hard bias structures 16. However, such an in-stack hard bias layer would increase the shield-to-shield spacing, SS, of the transducer 10. Such an increase is undesirable.

Accordingly, what is needed is a system and method for improving the cross-track resolution of a magnetic recording read transducer.

BRIEF SUMMARY OF THE INVENTION

A method and system provide a magnetic transducer having an air-bearing surface (ABS). The magnetic transducer includes a first shield, a read sensor, at least one soft magnetic bias structure and at least one hard bias structure. The read sensor includes a sensor layer that has at least one edge in the track width direction along the ABS. The soft magnetic bias structure(s) are adjacent to the edge(s) of the sensor layer. The soft magnetic bias structure has a first permeability. The soft bias structure(s) are between the read sensor and the hard bias structure(s). The hard bias structure(s) are adjacent to a portion of the soft bias structure(s) and have a second permeability. The first permeability is at least ten multiplied by the second permeability.

DETAILED DESCRIPTION OF THE PREFERRED EMBODIMENTS

Figure 1:
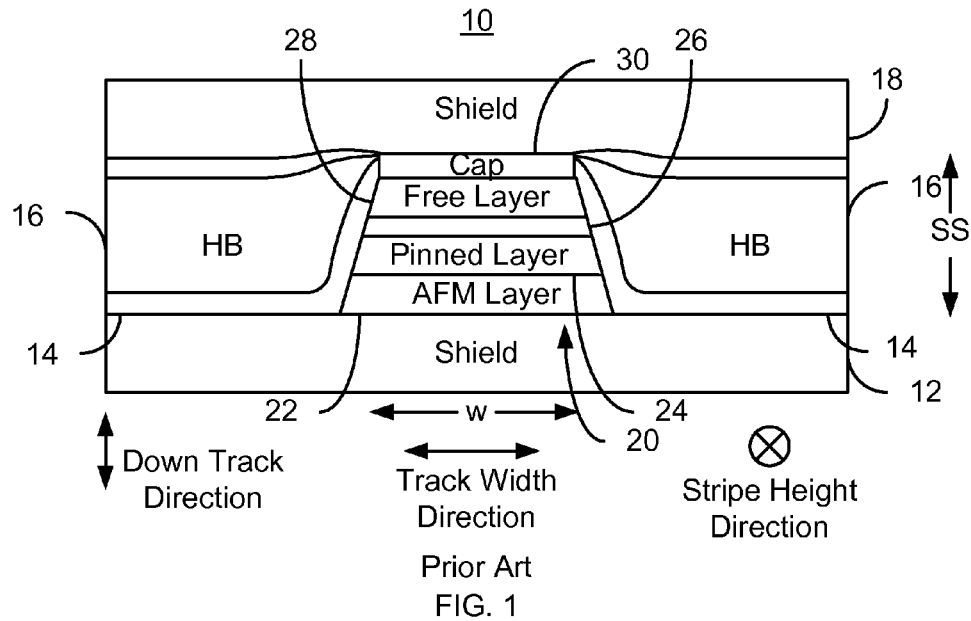
FIG. 1 depicts an ABS view of a conventional magnetic recording read transducer.
Figure 2:
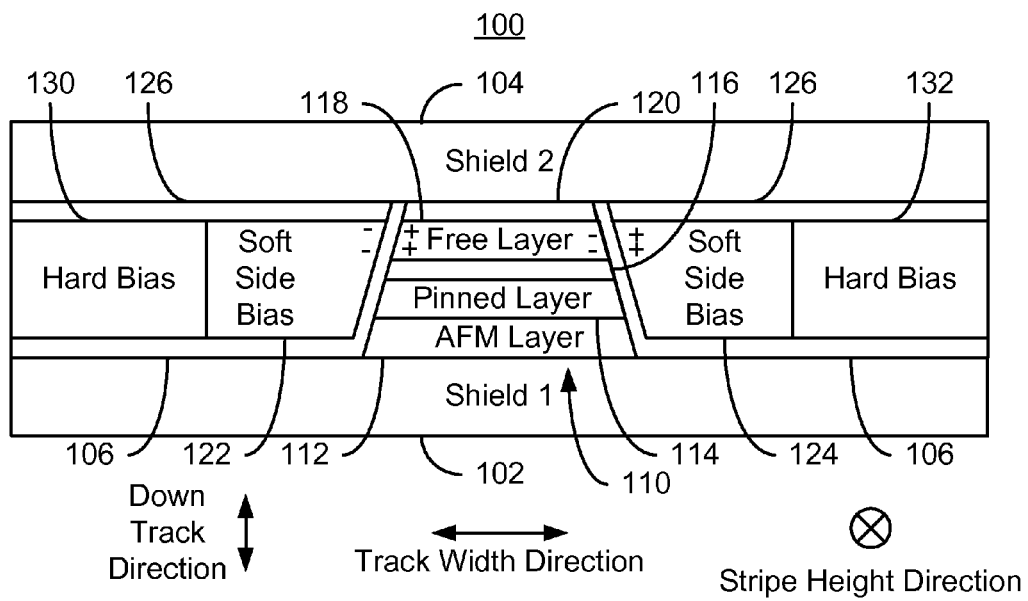
FIG. 2 depicts an ABS view of an exemplary embodiment of a portion of a magnetic recording read transducer.

FIG. 2 depicts an ABS view of an exemplary embodiment of a portion of a magnetic read transducer 100. For clarity, FIG. 2 is not to scale. The read transducer 100 may be part of a read head or may be part of a merged head that also includes a write transducer. The head of which the read transducer 100 is a part is part of a disk drive having a media, a slider and the head coupled with the slider. The read transducer 100 is also described in the context of particular components. In other embodiments, some of the components may be omitted, provided in a different location, or have different constituents. Further, other components may be used.

The transducer 100 includes shields 102 and 104, insulator 106, a read sensor 110, soft magnetic bias structures 122 and 124, and hard bias structures 130 and 132. The sensor 110 shown is a GMR or TMR sensor. Thus, the sensor 110 includes a pinning layer 112, a pinned layer 114, a nonmagnetic spacer layer 116, a free layer 118, and a capping layer 120. The sensor 110 may also include seed layer(s) (not shown). Although an AFM layer 112 used to pin the magnetic moment of the pinned layer 116 is shown, in other embodiments, the pinning layer may be omitted or may use a different pinning mechanism. The pinned layer 114 and free layer 118 are each shown as a single layer, but may include multiple layers including but not limited to a synthetic antiferromagnetic (SAF) structure. The nonmagnetic spacer layer 116 may be a conductive layer, a tunneling barrier layer, or other analogous layer. Although depicted as a GMR or TMR sensor, in other embodiments, other structures and other sensing mechanisms may be used for the sensor 110.

Figure 10:
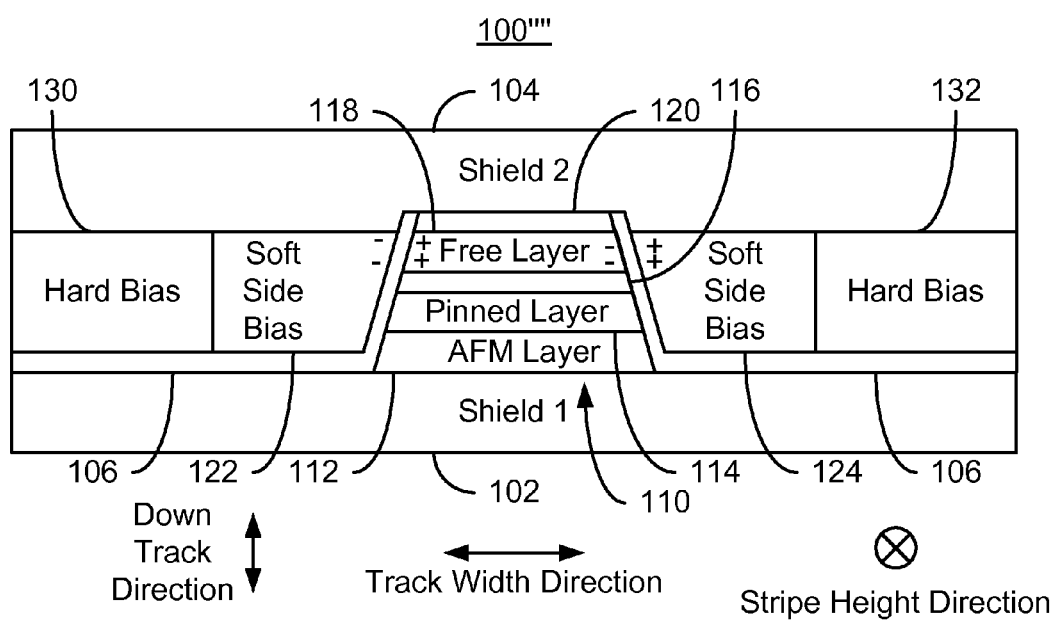
FIG. 10 depicts an ABS view of another exemplary embodiment of a portion of a magnetic recording read transducer.

The soft magnetic bias structures 122 and 124 are separated from the sensor layer 110 by insulating layer 106. Thus, the soft magnetic bias structures 122 and 124 are adjacent to the sides of the sensor 110. In the embodiment shown in FIG. 2, the soft magnetic bias structures 122 and 124 are also shown as separated from the shields 102 and 104 by nonmagnetic layers 106 and 126, respectively. Thus, the soft magnetic bias structures 122 and 124 are magnetically decoupled from the shields 102 and 104. However, in alternate embodiments, the soft magnetic bias structures 122 and/or 124 may be connected the shield 104 for example by omitting the layer 126. One such embodiment is depicted as transducer 100"" in FIG. 10. The transducer 100"" is analogous to the transducer 100, but the nonmagnetic layer 126 has been omitted.

The soft magnetic bias structures 122 and 124 are made using soft magnetic material(s). Thus, the soft magnetic bias structures 122 and/or 124 include magnetic material(s) that have a permeability of at least ten multiplied by the permeability of hard bias structures 130 and 132. For example, the soft magnetic bias structures 122 and/or 124 may include NiFe, such as Permalloy. Because the soft magnetic bias structures 122 and/or 124 have a high permeability, the soft magnetic side shield 102 and/or 104 magnetically biases the sensor 110. As can be seen in FIG. 2, the magnetic moment of the free layer 118 results in positive magnetic charges (+) on one side of the free layer 118 and negative magnetic charges (−) on the opposite side. Because the soft magnetic bias structures 122 and 124 have a high permeability, negative magnetic charges (−) are formed on the side of the soft magnetic bias structure 122 closest to the positive magnetic charges in the free layer 118. Similarly, positive magnetic charges (+) are formed on the side of the soft magnetic bias structures 124 closest to the negative magnetic charges in the free layer 118. Thus, the soft magnetic bias structures 122 and 124 may mirror the magnetic charges of the free layer 118. If the magnetization of the free layer 118 is in the opposite direction to that shown in FIG. 2, the soft magnetic bias structures 122 and 124 would be oppositely charged to mirror this magnetization. As a result, the soft magnetic bias structures 122 and 124 may magnetically bias the free layer 118. In addition, because of their high permeability, the soft magnetic side bias structures 122 and 124 may shield the free layer 118 from stray fields entering through the edges. Thus, the soft magnetic bias structures 122 and/or 124 may also act as side shields for the sensor 110.

In some embodiments, the soft magnetic bias structures 122 and/or 124 are composed of a single high full film permeability material, such as Permalloy. In other embodiments, the soft magnetic bias structures 122 and/or 124 include multiple materials, which may not all have a high permeability. For example, the magnetic bias structures 122 and/or 124 may be a multilayer. For example, the multilayer may include a first magnetic layer, a second magnetic layer, and a nonmagnetic layer between the first magnetic layer and the second magnetic layer. In some embodiments, the first and second magnetic layers may be antiferromagnetically aligned. In other embodiments, the first and second magnetic layer may be ferromagnetically aligned. Further, more than two ferromagnetic layers interleaved with nonmagnetic layers may be used. In other embodiments, all of the layers in the multilayer may be ferromagnetic.

In addition, the read transducer 100 includes hard bias structures 130 and 132. In the embodiment shown, the hard bias structures 130 and 132 share an interface with the soft magnetic bias structures 122 and 124, respectively. Thus, the hard bias structures 130 and 132 adjoin the soft magnetic bias structures 122 and 124, respectively. However, in other embodiments, a nonmagnetic layer may be provided between the hard bias structures 132 and 134 and the soft magnetic bias structures 122 and 124, respectively. Further, nonmagnetic layers 106 and 126 are depicted as being between the hard bias structures 130 and 132 and the shields 102 and 104, respectively. Thus, the hard bias structures 130 and 132 may be magnetically decoupled from the shields 102 and 104. However, in other embodiments, the portions of the layer 126 between the hard bias structures 130 and 132 and the shield 104 may be omitted. Thus, the hard bias structures 130 and/or 132 may be magnetically coupled with the shield 104.

Hard bias structures 130 and 132 are used to stabilize the soft magnetic bias structures 122 and 124, rather than to directly bias the free layer 118. Without hard bias structures 130 and/or 132, the soft magnetic bias structures 122 and/or 124, respectively, may be subject to reversals during fabrication or use, which is undesirable. The hard bias structure 130 and 132 are used to magnetically bias the soft bias structures 122 and 124, respectively. Stated differently, the hard bias structures 130 and/or 132 may be seen as pinning the soft bias structures 122 and/or 124, respectively.

The hard bias structures 130 and/or 132 have a permeability that is significantly lower than the soft bias structures 122 and/or 124. The hard bias structures 130 and 132 also generally have a significantly higher anisotropy field than the soft bias structures 122 and 124. For example, the anisotropy field of the hard bias structures may be on the order of a few thousand Oe in some embodiments. The coercivity of the hard bias structures 130 and 132 is also generally significantly higher than that of the soft bias structures 122 and 124. For example, in some embodiments, the coercivity of the hard bias structures 132 and 134 may be on the order of hundreds or thousands of Oe. Thus, the hard bias structures 130 and 132 are generally not susceptible to reversals during fabrication or operation. For example, may include CoPt, CoCrPt and/or FePt. Although shown as a single layer, the hard bias structures 130 and/or 132 may include multiple layers. In some embodiments, all of the layers in the multilayer are ferromagnetic. However, in other embodiments, some of the layers may be ferromagnetic, while other layers are nonmagnetic.

The transducer 100 thus enjoys the benefits of soft bias structures 122 and 124. In particular, the sensor 110 may be magnetically biased and enjoy the benefits of side shields such as reduced interference from adjacent tracks. Because of the presence of hard bias structures 130 and 132, the soft bias structures 122 and 124 may have improved magnetic uniformity and a significantly reduced chance of reversal. Thus, the reliability and performance of the transducer 100 may be improved. The magnetization direction of the hard bias structures 130 and 132 may be set by applying a magnetic field and without additional annealing. Thus, damage to the sensor 110 may be avoided. The hard bias structures 130 and/or 132 may also optionally be used to bias the shield 102 and/or 104. Thus, performance of the transducer 100 may be further improved. Fabrication of hard bias structures 130 and 132 may also be relatively simple. Thus, the benefits of the hard bias structures 130 and 132 may be attained without significantly complicating processing.

Figure 3:
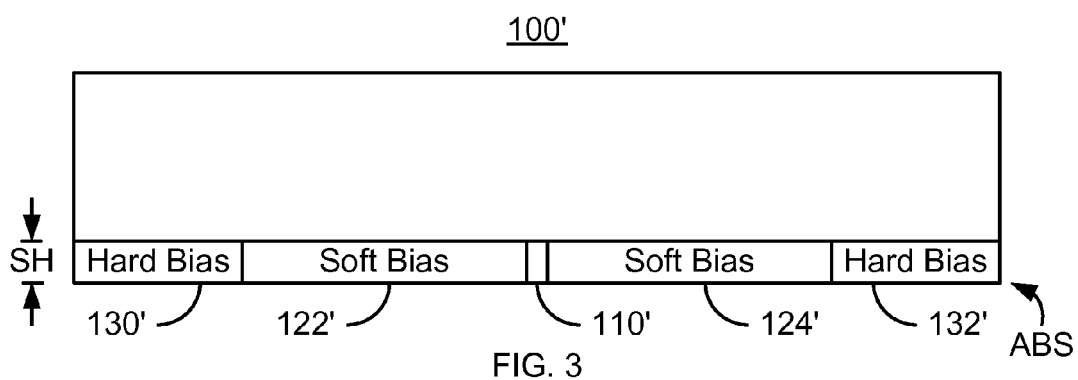
FIG. 3 is a plan view of an exemplary embodiment of a portion of a magnetic recording read transducer.

FIG. 3 depicts a plan view of another embodiment of a magnetic transducer 100'. For clarity, FIG. 3 is not to scale and some components are omitted. The read transducer 100' may be part of a read head or may be part of a merged head that also includes a write transducer. The head of which the read transducer 100' is a part is part of a disk drive having a media, a slider and the head coupled with the slider. The magnetic read transducer 100' may be viewed as an application of the magnetic transducer 100. Similar components have analogous labels. The magnetic transducer 100' includes sensor 110', soft magnetic bias structures 122' and 124', and hard magnetic bias structures 130' and 132' that correspond to the sensor 110, soft magnetic bias structures 122 and 124, and hard magnetic bias structures 130 and 132, respectively. Thus, the components 110', 122', 124', 130', and 132' have a similar structure and function to the components 110, 122, 124, 130, 132, respectively.

As can be seen in the plan view of FIG. 3, the sensor 110' extends a stripe height, SH, in the stripe height direction perpendicular to the ABS. In the embodiment shown in FIG. 3, the soft bias structures 122' and 124' extend the same distance in the stripe height direction as the sensor 110'. Similarly, the hard bias structures 130' and 132' extend the same distance in the stripe height direction as the soft bias structures 122' and 124' as well as the sensor 110'.

The transducer 100' may share the benefits of the transducer 100. The sensor 110' may be magnetically biased and enjoy the benefits of side shields such as reduced interference from adjacent tracks. The hard bias structures 130' and 132' may improve the magnetic uniformity of and reduce the chance of reversal for the soft bias structures 122' and 124'. Thus, the reliability and performance of the transducer 100' may be improved. The magnetization direction of the hard bias structures 130' and 132' may be set by applying a magnetic field and without additional annealing. Thus, damage to the sensor 110' may be avoided. The hard bias structures 130' and/or 132' may also optionally be used to bias the shield(s) (not shown). Thus, performance of the transducer 100' may be further improved. Fabrication of hard bias structures 130' and 132' may also be relatively simple. Thus, the benefits of the hard bias structures 130' and 132' may be attained without significantly complicating processing.

Figure 4:
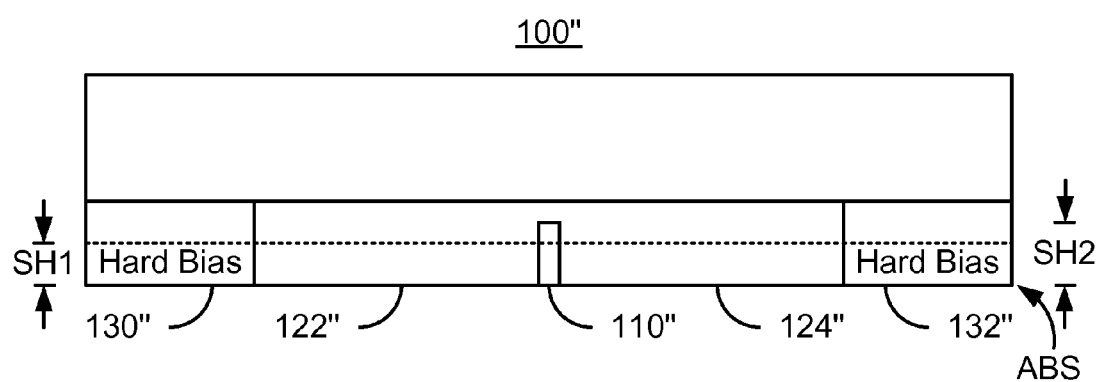
FIG. 4 is a plan view of another exemplary embodiment of a portion of a magnetic recording read transducer.

FIG. 4 depicts a plan view of another embodiment of a magnetic transducer 100". For clarity, FIG. 4 is not to scale and some components are omitted. The read transducer 100" may be part of a read head or may be part of a merged head that also includes a write transducer. The head of which the read transducer 100" is a part is part of a disk drive having a media, a slider and the head coupled with the slider. The magnetic read transducer 100" may be viewed as an application of the magnetic transducer 100. Similar components have analogous labels. The magnetic transducer 100" includes sensor 110", soft magnetic bias structures 122" and 124", and hard magnetic bias structures 130" and 132" that correspond to the sensor 110, soft magnetic bias structures 122 and 124, and hard magnetic bias structures 130 and 132, respectively. Thus, the components 110", 122", 124", 130", and 132" have a similar structure and function to the components 110, 122, 124, 130, 132, respectively.

As can be seen in the plan view of FIG. 4, the sensor 110" has two stripe heights SH1 and SH2. The stripe height SH1 may be for the entire sensor including the free layer. The stripe height SH2 may correspond to an extended pinned layer. Such an extended pinned layer extends further in the stripe height direction than the free layer. In the embodiment shown in FIG. 4, the soft magnetic bias structures 122" and 124" extend further in the stripe height direction than any portion of the sensor 110". In other embodiments, the soft bias magnetic structures 122" and/or 124" may extend only to the stripe height SH2. In some embodiments, the thickness of the soft magnetic bias structures 122" and 124" decreases further from the ABS than SH1. Thus, the soft magnetic bias structures 122" and 124" may be thinner in the region of the extended pinned layer. In still other embodiments, the soft magnetic bias structures 122" and/or 124" may extend only to the stripe height SH1. Similarly, the hard bias structures 130" and 132" extend further in the stripe height direction than any portion of the sensor 110". In other embodiments, the hard bias structures 130" and/or 132" may extend only to the stripe height SH2. In still other embodiments, the hard bias structures 130" and/or 132" may extend only to the stripe height SH1. In some embodiments, the thickness of the hard bias structures 130" and/or 132" decreases further from the ABS than SH1. Thus, the hard bias structures 130" and/or 132" may be thinner in the region of the extended pinned layer.

The transducer 100" may share the benefits of the transducer 100. The sensor 110" may be magnetically biased and enjoy the benefits of side shields such as reduced interference from adjacent tracks. The hard bias structures 130" and 132" may improve the magnetic uniformity of and reduce the chance of reversal for the soft bias structures 122" and 124". Thus, the reliability and performance of the transducer 100" may be improved. The magnetization direction of the hard bias structures 130" and 132" may be set by applying a magnetic field and without additional annealing. Thus, damage to the sensor 110" may be avoided. The hard bias structures 130" and/or 132" may also optionally be used to bias the shield(s) (not shown). Thus, performance of the transducer 100" may be further improved. Fabrication of hard bias structures 130" and 132" may also be relatively simple. Thus, the benefits of the hard bias structures 130" and 132" may be attained without significantly complicating processing.

Figure 5:
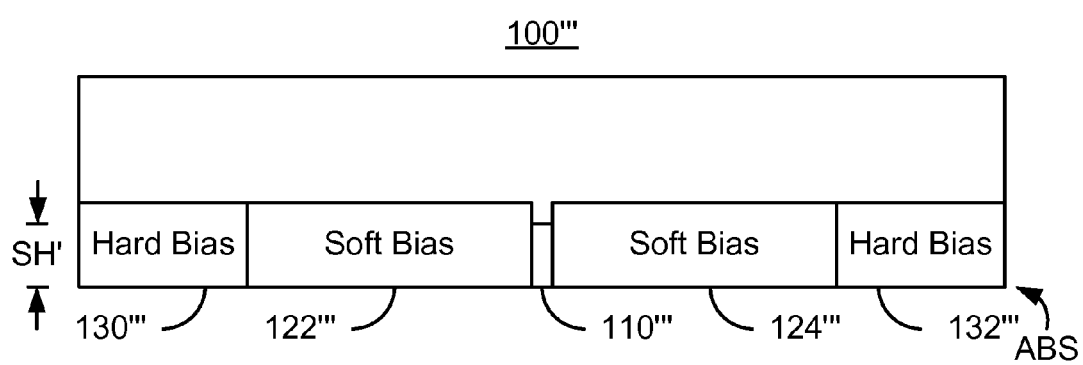
FIG. 5 is a plan view of another exemplary embodiment of a portion of a magnetic recording read transducer.

FIG. 5 depicts a plan view of another embodiment of a magnetic transducer 100'''. For clarity, FIG. 5 is not to scale and some components are omitted. The read transducer 100''' may be part of a read head or may be part of a merged head that also includes a write transducer. The head of which the read transducer 100''' is a part is part of a disk drive having a media, a slider and the head coupled with the slider. The magnetic read transducer 100''' may be viewed as an application of the magnetic transducer 100. Similar components have analogous labels. The magnetic transducer 100''' includes sensor 110''', soft magnetic bias structures 122''' and 124''', and hard magnetic bias structures 130''' and 132''' that correspond to the sensor 110, soft magnetic bias structures 122 and 124, and hard magnetic bias structures 130 and 132, respectively. Thus, the components 110", 122", 124", 130", and 132" have a similar structure and function to the components 110, 122, 124, 130, 132, respectively.

As can be seen in the plan view of FIG. 5, the sensor 110''' has a stripe height SH'. The soft magnetic bias structures 122''' and 124''' extend a different distance from the ABS than the sensor 110'''. In the embodiment shown in FIG. 5, the soft magnetic bias structures 122''' and 124''' extend further in the stripe height direction than the sensor 110". In other embodiments, the soft bias magnetic structures 122''' and/or 124''' may not extend as far from the ABS as the sensor 110'''. Similarly, the hard bias structures 130''' and 132''' extend a different distance from the ABS than the sensor 110'''. In the embodiment shown, the hard bias structures 130''' and 132''' extend further in the stripe height direction than the sensor 110'''. In other embodiments, the hard bias structures 130''' and/or 132''' may not extend as far in the stripe height direction as the sensor 110'''. Further, the hard bias structures 130''' and/or 132''' may extend a different distance in the stripe height direction than the soft magnetic bias structures 122''' and 124'''.

The transducer 100''' may share the benefits of the transducer 100. The sensor 110''' may be magnetically biased and enjoy the benefits of side shields such as reduced interference from adjacent tracks. The hard bias structures 130''' and 132''' may improve the magnetic uniformity of and reduce the chance of reversal for the soft bias structures 122''' and 124'''. Thus, the reliability and performance of the transducer 100''' may be improved. The magnetization direction of the hard bias structures 130''' and 132''' may be set by applying a magnetic field and without additional annealing. Thus, damage to the sensor 110''' may be avoided. The hard bias structures 130''' and/or 132''' may also optionally be used to bias the shield(s) (not shown). Thus, performance of the transducer 100''' may be further improved. Fabrication of hard bias structures 130''' and 132''' may also be relatively simple. Thus, the benefits of the hard bias structures 130''' and 132''' may be attained without significantly complicating processing.

Figure 6:
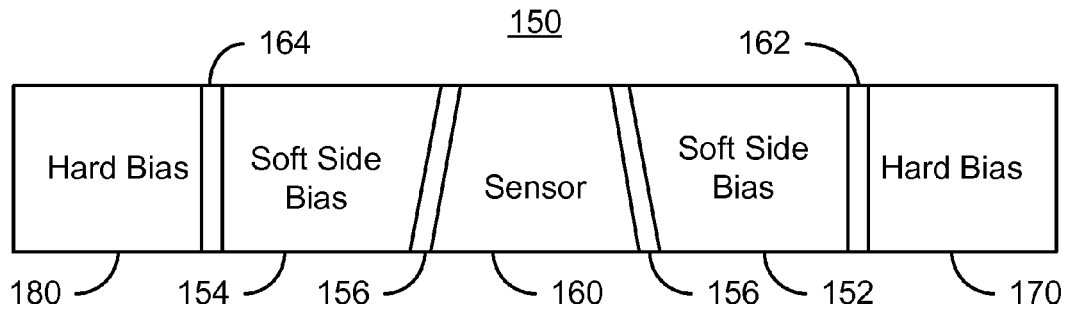
FIG. 6 is an ABS view of another exemplary embodiment of a portion of a magnetic recording read transducer.

FIG. 6 depicts an ABS view of another embodiment of a magnetic transducer 150. For clarity, FIG. 6 is not to scale and some components are omitted. The read transducer 150 may be part of a read head or may be part of a merged head that also includes a write transducer. The head of which the read transducer 150 is a part is part of a disk drive having a media, a slider and the head coupled with the slider. The magnetic read transducer 150 may be viewed as an application of the magnetic transducer 100, 100', 100", or 100'''. Similar components have analogous labels. The magnetic transducer 150 includes sensor 160, insulating layers 156, soft magnetic bias structures 152 and 154, and hard magnetic bias structures 170 and 180 that correspond to the sensor 110/110'/110"/110''', insulator 106, soft magnetic bias structures 122/122'/122"/122''' and 124/124'/124"/124''', and hard magnetic bias structures 130/130'/130"/130''' and 132/132'/132"/132''', respectively. Thus, the components 160, 156, 152, 154, 170, and 180 have a similar structure and function to the components 110/110'/110"/110''', 106, 122/122'/122"/122''', 124/124'/124"/124''', 130/130'/130"/130''', and 132/132'/132"/132''', respectively.

In the embodiment shown in FIG. 6, the hard bias structures 170 and 180 do not adjoin the soft magnetic bias structures 152 and 154, respectively. Instead, the hard bias structures 170 and 180 are separated from the soft magnetic bias structures 152 and 154 by a nonmagnetic layer 162 and 164, respectively. Such a layer 162 or 164 may be used to simplify fabrication of the hard bias structures 170 and 180.

The transducer 150 may share the benefits of the transducer 100, 100', 100", and/or 100'''. The sensor 160 may be magnetically biased and enjoy the benefits of side shields such as reduced interference from adjacent tracks. The hard bias structures 170 and 180 may improve the magnetic uniformity of and reduce the chance of reversal for the soft bias structures 152 and 154. Thus, the reliability and performance of the transducer 150 may be improved. The magnetization direction of the hard bias structures 170 and 180 may be set by applying a magnetic field and without additional annealing. Thus, damage to the sensor 160 may be avoided. The hard bias structures 170 and/or 180 may also optionally be used to bias the shield(s) (not shown). Thus, performance of the transducer 150 may be further improved. Fabrication of hard bias structures 170 and 180 may also be relatively simple and may be further eased by use of the nonmagnetic layers 162 and 164. Thus, the benefits of the hard bias structures 170 and 180 may be attained without significantly complicating processing.

Figure 7:
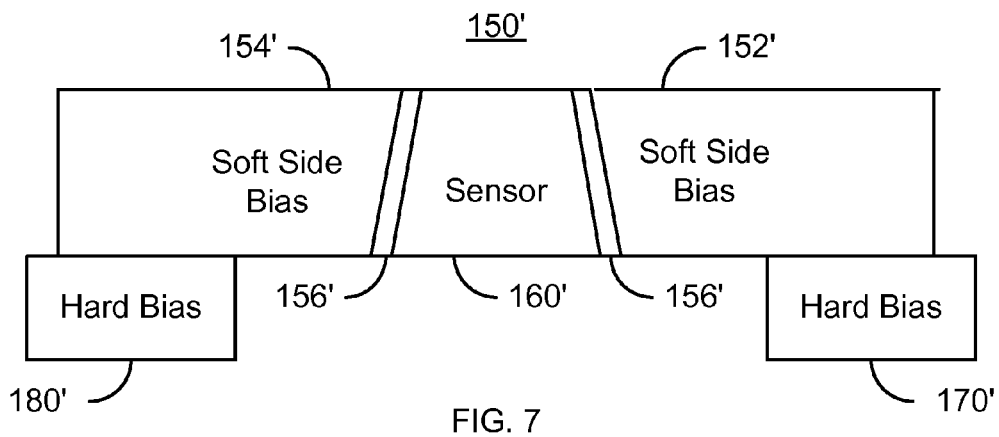
FIG. 7 is an ABS view of another exemplary embodiment of a portion of a magnetic recording read transducer.

FIG. 7 depicts an ABS view of another embodiment of a magnetic transducer 150'. For clarity, FIG. 7 is not to scale and some components are omitted. The read transducer 150' may be part of a read head or may be part of a merged head that also includes a write transducer. The head of which the read transducer 150' is a part is part of a disk drive having a media, a slider and the head coupled with the slider. The magnetic read transducer 150' may be viewed as an application of the magnetic transducer 100, 100', 100", 100''', or 150. Similar components have analogous labels. The magnetic transducer 150' includes sensor 160', insulator 156', soft magnetic bias structures 152' and 154', and hard bias structures 170' and 180' that correspond to the sensor 160/110/110'/110"/110''', insulator 156/106, soft magnetic bias structures 152/122/122'/122"/122''' and 154/124/124'/124"/124''', and hard magnetic bias structures 170/130/130'/130"/130''' and 180/132/132'/132"/132''', respectively. Thus, the components 160', 156', 152', 154', 170', and 180' have a similar structure and function to the components 160/110/110'/110"/110''', 156/106, 152/122/122'/122"/122''', 154/124/124'/124"/124''', 170/130/130'/130"/130''', and 180/132/132'/132"/132''', respectively. Although not shown, in some embodiments, a nonmagnetic layer may reside between the soft magnetic bias structures 152' and 154' and hard bias structures 170' and 180', respectively. However, in the embodiment shown in FIG. 7, the hard bias structures 170' and 180' reside below the soft magnetic bias structures 152' and 154', respectively. In other embodiments, the hard bias structures 170' and 180' may reside on top of the soft magnetic bias structures 152' and 154', respectively.

The transducer 150' may share the benefits of the transducers 150, 100, 100', 100", and/or 100'''. The sensor 160' may be magnetically biased and enjoy the benefits of side shields such as reduced interference from adjacent tracks. The hard bias structures 170' and 180' may improve the magnetic uniformity of and reduce the chance of reversal for the soft bias structures 152' and 154'. Thus, the reliability and performance of the transducer 150' may be improved. The magnetization direction of the hard bias structures 170' and 180' may be set by applying a magnetic field and without additional annealing. Thus, damage to the sensor 160' may be avoided. The hard bias structures 170' and/or 180' may also optionally be used to bias the shield(s) (not shown). Thus, performance of the transducer 150' may be further improved.

Figure 8A:
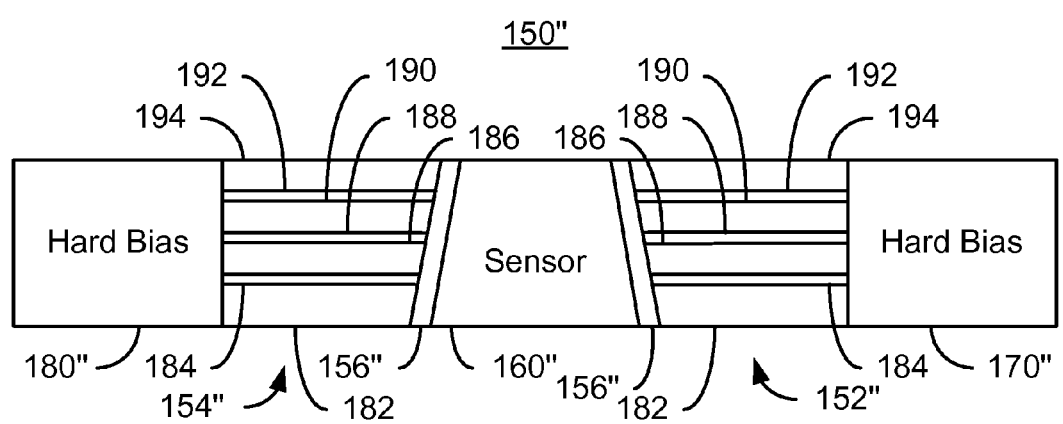
FIG. 8A is an ABS view of another exemplary embodiment of a portion of a magnetic recording read transducer.

FIG. 8A depicts an ABS view of another embodiment of a magnetic transducer 150". For clarity, FIG. 8A is not to scale and some components are omitted. The read transducer 150" may be part of a read head or may be part of a merged head that also includes a write transducer. The head of which the read transducer 150" is a part is part of a disk drive having a media, a slider and the head coupled with the slider. The magnetic read transducer 150" may be viewed as an application of the magnetic transducer 100, 100', 100", 100''', 150, or 150'. Similar components have analogous labels. The magnetic transducer 150" includes sensor 160", insulator 156", soft magnetic bias structures 152" and 154", and hard bias structures 170" and 180" that correspond to the sensor 160'/160/110/110'/110"/110''', insulator 156'/156/106, soft magnetic bias structures 152'/152/122/122'/122"/122''' and 154'/ 154/124/124'/124"/124''', and hard magnetic bias structures 170'/170/130/130'/130"/130''' and 180'/180/132/132'/132"/ 132''', respectively. Thus, the components 160", 156", 152", 154", 170", and 180" have a similar structure and function to the components 160'/160/110/110'/110"/110''', 156'/156/106, 152'/152/122/122'/122"/122''', 154'/154/124/124'/124"/ 124''', 170'/170/130/130'/130"/130''', and 180'/180/132/132'/ 132"/132''', respectively. Although not shown, in some embodiments, a nonmagnetic layer may reside between the soft magnetic bias structures 152" and 154" and the hard bias structures 170" and 180", respectively.

In the embodiment shown in FIG. 8A, the soft magnetic bias structures 152" and 154" include multiple layers. More specifically, the soft magnetic bias structures 152" and 154" each include layers 182, 184, 186, 188, 190, 192, and 194. The thickness of the layers 182, 184, 186, 188, 190, 192, and 194 is not to scale. In some embodiments, all of the layers 182, 184, 186, 188, 190, 192, and 194 are ferromagnetic. In other embodiments only some of the layers 182, 184, 186, 188, 190, 192, and 194 are ferromagnetic. For example, layers 182, 186, 190, and 194 are ferromagnetic while layers 184, 188, and 192 are nonmagnetic. In some embodiments, the ferromagnetic layers 182, 186, 190, and 194 are ferromagnetically aligned while in other embodiments, the ferromagnetic layers 182, 186, 190, and 194 are antiferromagnetically aligned. For example, the direction of magnetization may alternate between layers 182, 186, 190, and 194. In other embodiments, other arrangements of the layers 182, 184, 186, 188, 190, 192, and 194 are possible. Further, another number of layers may be used. Multiple layers 182, 184, 186, 188, 190, 192, and 194 of the soft magnetic bias structures 152" and 154" may allow for the properties of the soft magnetic bias structures 152" and 154" to be tailored. Although not shown, the hard bias structures 170" and/or 180" may also be multilayers.

The transducer 150" may share the benefits of the transducers 150', 150, 100, 100', 100", and/or 100'''. The sensor 160" may be magnetically biased and enjoy the benefits of side shields such as reduced interference from adjacent tracks. The hard bias structures 170" and 180" may improve the magnetic uniformity of and reduce the chance of reversal for the soft bias structures 152" and 154". Thus, the reliability and performance of the transducer 150" may be improved. The magnetization direction of the hard bias structures 170" and 180" may be set by applying a magnetic field and without additional annealing. Thus, damage to the sensor 160" may be avoided. The hard bias structures 170" and/or 180" may also optionally be used to bias the shield(s) (not shown). Thus, performance of the transducer 150" may be further improved. Fabrication of hard bias structures 170" and 180" may also be relatively simple. Thus, the benefits of the hard bias structures 170" and 180" may be attained without significantly complicating processing.

Figure 8B:
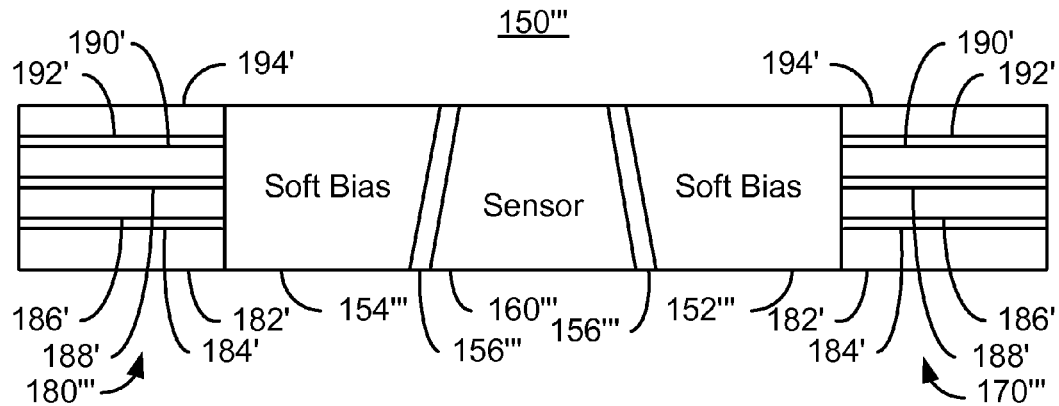
FIG. 8B is an ABS view of another exemplary embodiment of a portion of a magnetic recording read transducer.

FIG. 8B depicts an ABS view of another embodiment of a magnetic transducer 150''''. For clarity, FIG. 8B is not to scale and some components are omitted. The read transducer 150''' may be part of a read head or may be part of a merged head that also includes a write transducer. The head of which the read transducer 150''' is a part is part of a disk drive having a media, a slider and the head coupled with the slider. The magnetic read transducer 150''' may be viewed as an application of the magnetic transducer 100, 100', 100", 100''', 150, 150', or 150". Similar components have analogous labels. The magnetic transducer 150''' includes sensor 160''', insulator 156''', soft magnetic bias structures 152''' and 154''', and hard bias structures 170''' and 180''' that correspond to the sensor 160"/160'/160/110/110'/110"/110''', insulator 156"/156'/156/ 106, soft magnetic bias structures 152"/152'/152/122/122'/ 122"/122''' and 154"/154'/154/124/124'/124"/124''', and hard magnetic bias structures 170"/170'/170/130/130'/130"/130''' and 180"/180'/180/132/132'/132"/132''', respectively. Thus, the components 160''', 156''', 152''', 154''', 170''', and 180''' have a similar structure and function to the components 160"/ 160'/160/110/110'/110"/110''', 156"/156'/156/106, 152"/ 152'/152/122/122'/122"/122''', 154"/154'/154/124/124'/124"/ 124''', 170"/170'/170/130/130'/130"/130''', and 180"/180'/ 180/132/132'/132"/132''', respectively. Although not shown, in some embodiments, a nonmagnetic layer may reside between the soft magnetic bias structures 152''' and 154''' and the hard bias structures 170''' and 180''', respectively.

In the embodiment shown in FIG. 8B, the hard bias structures 170''' and 180''' include multiple layers. More specifically, the hard bias structures 170''' and 180''' each include layers 182', 184', 186', 188', 190', 192', and 194'. The thickness of the layers 182', 184', 186', 188', 190', 192', and 194' is not to scale. In some embodiments, all of the layers 182', 184', 186', 188', 190', 192', and 194' are ferromagnetic. In other embodiments only some of the layers 182', 184', 186', 188', 190', 192', and 194' are ferromagnetic. For example, layers 182', 186', 190', and 194' are ferromagnetic while layers 184', 188', and 192' are nonmagnetic. In other embodiments, other arrangements of the layers 182', 184', 186', 188', 190', 192', and 194' are possible. Further, another number of layers may be used. Multiple layers 182', 184', 186', 188', 190', 192', and 194' of the hard bias structures 170''' and 180''' may allow for the properties of the hard bias structures 170''' and 180''' to be tailored.

The transducer 150''' may share the benefits of the transducers 150", 150', 150, 100, 100', 100", and/or 100'''. The sensor 160''' may be magnetically biased and enjoy the benefits of side shields such as reduced interference from adjacent tracks. The hard bias structures 170''' and 180''' may improve the magnetic uniformity of and reduce the chance of reversal for the soft bias structures 152''' and 154'''. Thus, the reliability and performance of the transducer 150''' may be improved. The magnetization direction of the hard bias structures 170''' and 180''' may be set by applying a magnetic field and without additional annealing. Thus, damage to the sensor 160''' may be avoided. The hard bias structures 170''' and/or 180''' may also optionally be used to bias the shield(s) (not shown). Thus, performance of the transducer 150''' may be further improved. Fabrication of hard bias structures 170''' and 180''' may also be relatively simple. Thus, the benefits of the hard bias structures 170''' and 180''' may be attained without significantly complicating processing.

Figure 9:
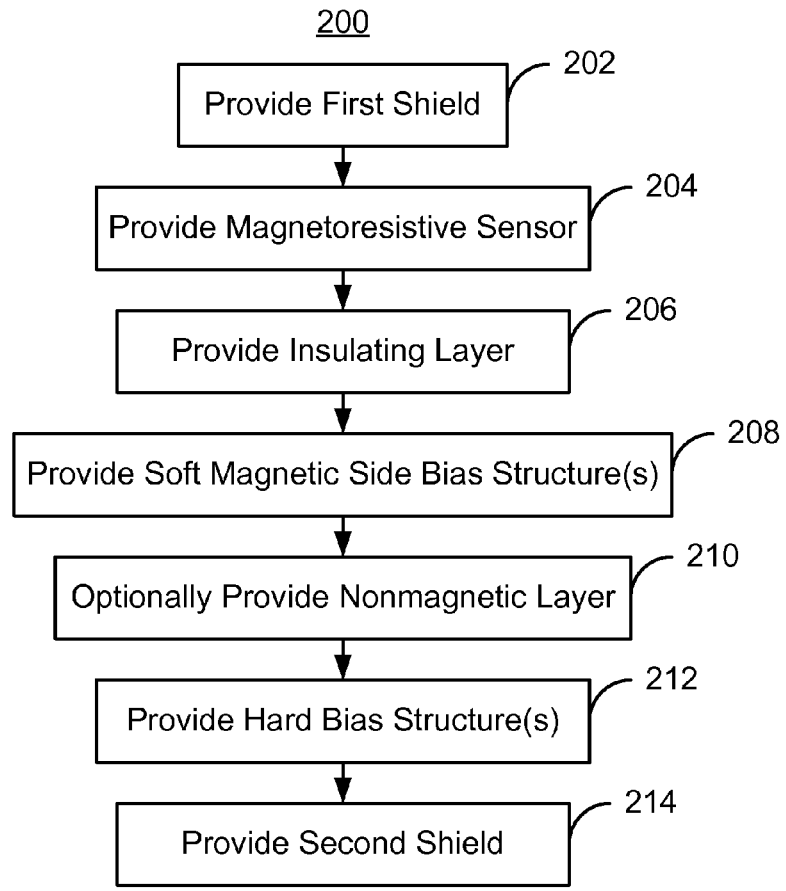
FIG. 9 is flow chart depicting an exemplary embodiment of a method for fabricating a portion of a magnetic recording read transducer.

FIG. 9 is an exemplary embodiment of a method 200 for providing a read transducer utilizing soft magnetic bias structures in combination with hard magnetic bias structures. For simplicity, some steps may be omitted, interleaved, and/or combined. The method 200 is also described in the context of providing a single recording transducer 100. However, the method 200 may be used to fabricate multiple transducers at substantially the same time. The method 200 may also be used to fabricate other transducers including but not limited to any combination of 100', 100", 100''', 150, 150', and/or 150". The method 200 is also described in the context of particular layers. A particular layer may include multiple materials and/ or multiple sub-layers. The method 200 also may start after formation of other portions of the magnetic recording transducer.

The first shield 102 is provided, via step 202. Step 202 typically includes depositing a large high permeability layer. The sensor 110 is provided, via step 204. Step 204 typically includes depositing the layers for the sensor 110, then defining the sensor 110 in at least the track width direction using an ion mill. In some embodiments, the sensor 110 is also defined in the stripe height direction. In some embodiments, the layers for the sensor are not completely milled through to provide an extended pinned layer. The insulator 106 may then be provided, via step 206.

The soft magnetic bias structures 122 and 124 are provided, via step 208. Step 208 may include depositing the high permeability and any other material(s) for the soft magnetic bias structures 122 and 124 and defining the soft magnetic bias structures 122 and 124 in the track width and stripe height direction. Step 208 may also include depositing multiple layers for the soft magnetic bias structures 122 and/or 124. Further, in some embodiments, the soft magnetic bias structures 122 and 124 are provided such that they may be magnetically coupled to the shield 102 and/or 104. A nonmagnetic layer, such as the layer 162 and/or 164 may optionally be provided via step 210. However, in other embodiments, step 210 may be omitted.

The hard bias structures 130 and 132 are provided, via step 212. In some embodiments, step 212 is performed after step 208. Thus, the hard bias structures 130 and 132 are provided after the soft magnetic bias structures 22 and 124. Thus, the soft magnetic bias structures 122 and 124 would be defined in at least the track width direction prior to deposition of the hard bias structures 130 and 132. Any excess material for the hard bias structures 130 and 132 may then be removed. In other embodiments, the hard bias structures 130 and 132 might be provided first. Portions of the hard bias structures 130 and 132 closer to the sensor 110 may then be removed and the soft magnetic bias structures 122 and 124 deposited.

The shield 104 may then be deposited, via step 214. In some embodiments, the shield 104 may be magnetically coupled to the soft magnetic bias structures 122 and 124 and/or the hard bias structures 130 and/or 132. Formation of the transducer 100 may then be completed.

Using the method 200, the transducers 100, 100', 100'', 150, 150', and/or 150'' may be fabricated. Thus, the benefits of one or more of the transducers 100, 100', 100'', 150, 150', and/or 150'' may be achieved.

We claim:

1. A magnetic read transducer having an air-bearing surface (ABS) and comprising:
   a first shield;
   a read sensor including a sensor layer, the sensor layer having at least one edge in the track width direction along the ABS;
   at least one soft magnetic bias structure adjacent to the at least one edge, the at least one soft magnetic bias structure having a first permeability;
   at least one hard bias structure adjacent to a portion of the at least one soft bias structure and having a second permeability, the at least one soft bias structure being between the read sensor and the at least one hard bias structure, the first permeability is at least ten multiplied by the second permeability;
   a second shield, the read sensor residing between the first shield and the second shield, the at least one soft magnetic bias structure being physically connected with the second shield.

2. The magnetic read transducer of claim 1 further comprising:
   an insulating layer residing between the at least one soft magnetic bias structure and the read sensor.

3. The magnetic read transducer of claim 1 wherein the at least one soft magnetic bias structure acts as at least one magnetic side shield and is magnetically coupled with the second shield.

4. The magnetic read transducer of claim 1 wherein the at least one hard bias structure shares at least one interface with the at least one soft magnetic bias structure.

5. A disk drive comprising:
   a media;
   a slider including a magnetic read transducer having an air-bearing surface (ABS), the magnetic read transducer including a first shield, a read sensor, a second shield, at least one soft magnetic bias structure, and at least one hard bias structure, the read sensor including a sensor layer, the sensor layer having at least one edge in the track width direction along the ABS, the at least one soft magnetic bias structure being adjacent to the at least one edge and having a first permeability, the at least one hard bias structure adjacent to a portion of the at least one soft bias structure and having a second permeability, the first permeability being at least ten multiplied by the second permeability, the at least one soft bias structure being between the read sensor and the at least one hard bias structure, the at least one soft magnetic bias structure being physically connected with the second shield.

6. A method for providing a magnetic read transducer having an air-bearing surface (ABS) comprising:
   providing a first shield;
   providing a read sensor including a sensor layer, the sensor layer having at least one edge in the track width direction along the ABS;
   providing at least one soft magnetic bias structure adjacent to the at least one edge, the at least one soft magnetic bias structure having a first permeability;
   providing at least one hard bias structure adjacent to a portion of the at least one soft bias structure and having a second permeability, the at least one soft bias structure being between the read sensor and the at least one hard bias structure, the first permeability being at least ten multiplied by the second permeability; and
   providing a second shield, the read sensor residing between the first shield and the second shield, the at least one soft magnetic bias structure being physically connected with the second shield.

7. The method of claim 6 further comprising:
   providing an insulating layer residing between the at least one soft magnetic bias structure and the read sensor.

8. The method of claim 6 wherein the at least one soft magnetic bias structure acts as at least one magnetic side shield and is magnetically coupled with the second shield.

9. The method of claim 6 wherein the at least one hard bias structure shares at least one interface with the at least one soft magnetic bias structure.

* * * * *